United States Patent
Kowalchuk

(10) Patent No.: US 7,264,423 B2
(45) Date of Patent: Sep. 4, 2007

(54) HOSE RESTRAINT APPARATUS

(75) Inventor: Trevor L. Kowalchuk, Saskatoon (CA)

(73) Assignee: CNH Canada, Ltd. (CA)

( * ) Notice: Subject to any disclaimer, the term of this patent is extended or adjusted under 35 U.S.C. 154(b) by 344 days.

(21) Appl. No.: 11/049,492

(22) Filed: Feb. 2, 2005

(65) Prior Publication Data
US 2006/0169798 A1    Aug. 3, 2006

(51) Int. Cl.
*B65G 51/18*    (2006.01)
(52) U.S. Cl. ..................................... 406/181; 111/175
(58) Field of Classification Search .............. 406/181; 111/175
See application file for complete search history.

(56) References Cited

U.S. PATENT DOCUMENTS

| | | | |
|---|---|---|---|
| 2,461,427 A | | 2/1949 | Kneebone |
| 2,642,317 A | * | 6/1953 | King ........................... 406/155 |
| 3,189,230 A | * | 6/1965 | Gillespie ..................... 406/127 |
| 3,272,561 A | * | 9/1966 | Farnsworth et al. ........ 406/181 |
| 3,490,654 A | | 1/1970 | Fischer |
| 3,874,713 A | | 4/1975 | Myers |
| 3,989,394 A | | 11/1976 | Ellis |
| 4,024,822 A | * | 5/1977 | Ross et al. ..................... 111/34 |
| 4,264,242 A | * | 4/1981 | Lecomte ..................... 406/155 |
| 4,340,244 A | | 7/1982 | Scott |
| 4,377,301 A | | 3/1983 | Craig et al. |
| 4,379,664 A | * | 4/1983 | Klein et al. ................... 406/68 |
| 4,467,846 A | * | 8/1984 | Croser ......................... 141/47 |
| 4,473,016 A | | 9/1984 | Gust |
| 4,475,819 A | | 10/1984 | Balmer |
| 4,562,968 A | * | 1/1986 | Widmer et al. .............. 239/655 |
| 4,685,843 A | * | 8/1987 | Kelm .......................... 406/181 |
| 4,717,289 A | * | 1/1988 | Popowich et al. .......... 406/122 |
| 4,790,484 A | * | 12/1988 | Wall ............................. 239/655 |
| 5,028,009 A | * | 7/1991 | Takata ......................... 239/655 |
| D323,174 S | * | 1/1992 | Takata et al. ............... D15/199 |
| 5,114,078 A | * | 5/1992 | Takata ......................... 239/655 |
| 5,143,623 A | * | 9/1992 | Kroll ........................... 210/705 |
| 5,215,127 A | * | 6/1993 | Bergeron ...................... 141/10 |
| 5,271,567 A | * | 12/1993 | Bauer .......................... 239/662 |
| 5,379,706 A | * | 1/1995 | Gage et al. .................. 111/175 |
| 5,626,296 A | * | 5/1997 | Monson et al. .............. 239/655 |
| 5,628,184 A | * | 5/1997 | Santos ...................... 60/39.281 |
| 5,979,343 A | * | 11/1999 | Gregor et al. ............... 111/175 |
| 5,992,699 A | * | 11/1999 | Johnson et al. ........... 222/185.1 |
| 5,996,515 A | * | 12/1999 | Gregor et al. ............... 111/174 |
| 6,047,652 A | * | 4/2000 | Prairie et al. ................ 111/174 |
| 6,116,284 A | * | 9/2000 | Murray et al. ................. 138/39 |
| 6,116,552 A | * | 9/2000 | Johnson ........................ 248/146 |

(Continued)

*Primary Examiner*—Joe Dillon, Jr.
(74) *Attorney, Agent, or Firm*—Rebecca Henkel

(57) ABSTRACT

A restraint apparatus configured to selectively attach a flexible hose at an outlet structure of a manifold of an air conveyance system is provided. The restraint apparatus includes a restraint member having a flat, planar shape. The restraint member includes a first opening located at a first end and a second opening located at a second end opposite the first end. The first and second ends of the restraint member are configured to be biased toward each other such that the first opening is operable to receive the outlet port therethrough and the second opening is operable to receive the hose therethrough. Upon release of the first and second ends of the restraint member, the first and second ends are operable to exert a bias force against the outlet structure and the hose, respectively, in a manner that resists removal of the hose from the outlet structure.

10 Claims, 4 Drawing Sheets

U.S. PATENT DOCUMENTS

| | | |
|---|---|---|
| 6,227,770 B1 | 5/2001 | Poncelet et al. |
| 6,273,648 B1 | 8/2001 | Poncelet et al. |
| 6,290,433 B2 | 9/2001 | Poncelet et al. |
| 6,499,413 B2 * | 12/2002 | Kleinknecht et al. ....... 111/174 |
| 6,725,788 B2 * | 4/2004 | McCartney et al. ......... 111/175 |
| 7,140,310 B2 * | 11/2006 | Mayerle et al. ............. 111/175 |
| 7,162,962 B2 * | 1/2007 | Fuessel et al. .............. 111/176 |

* cited by examiner

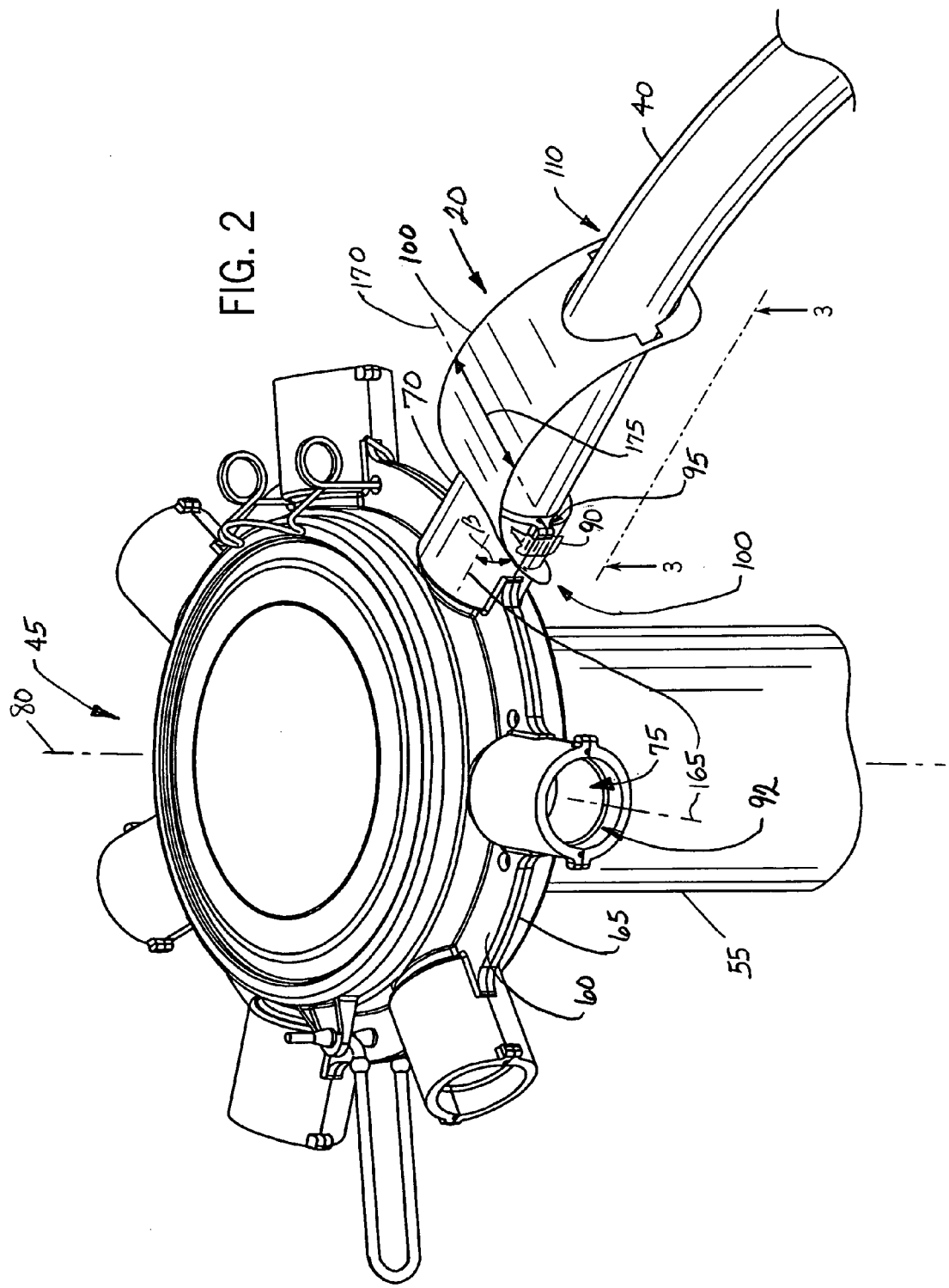

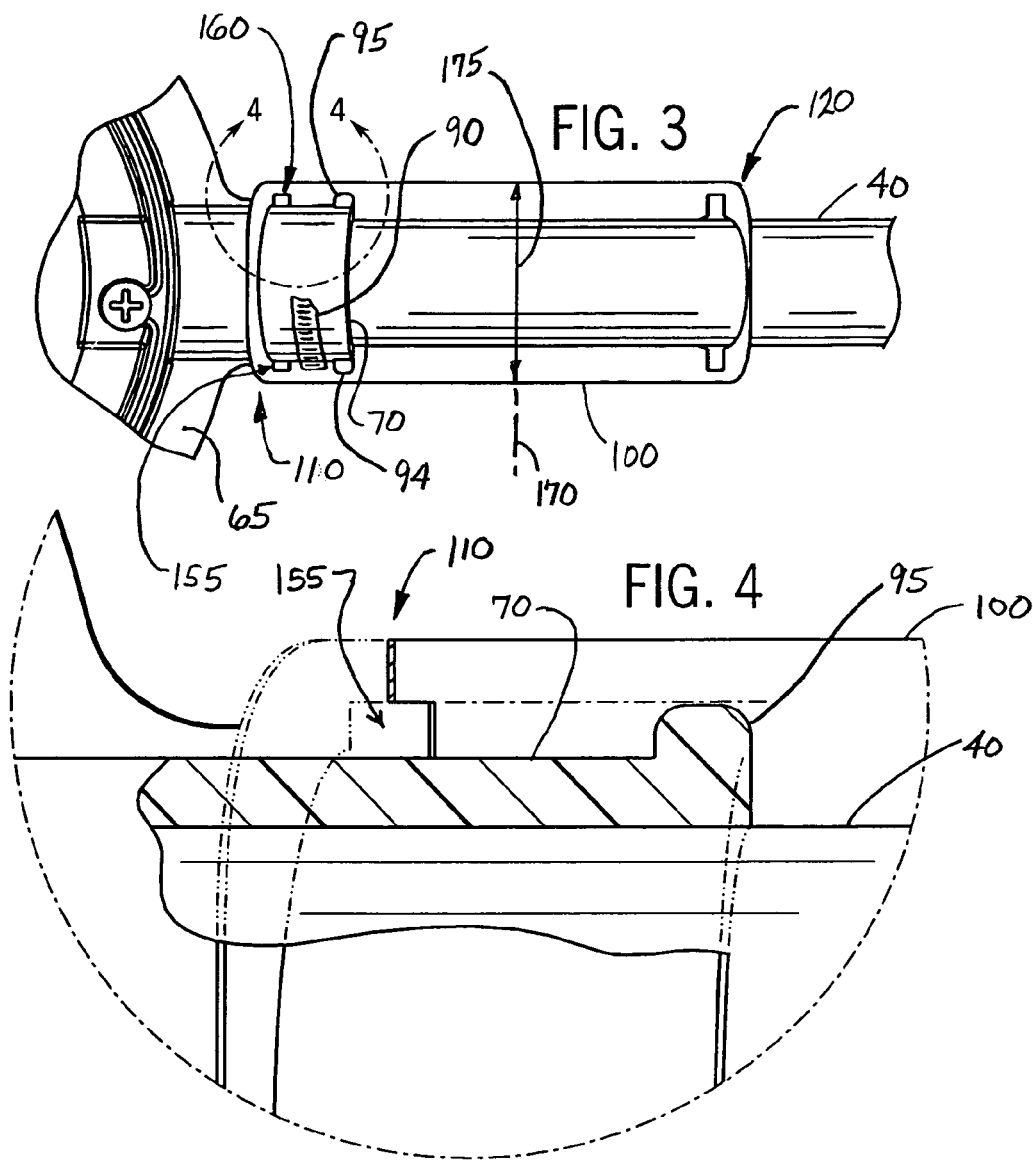
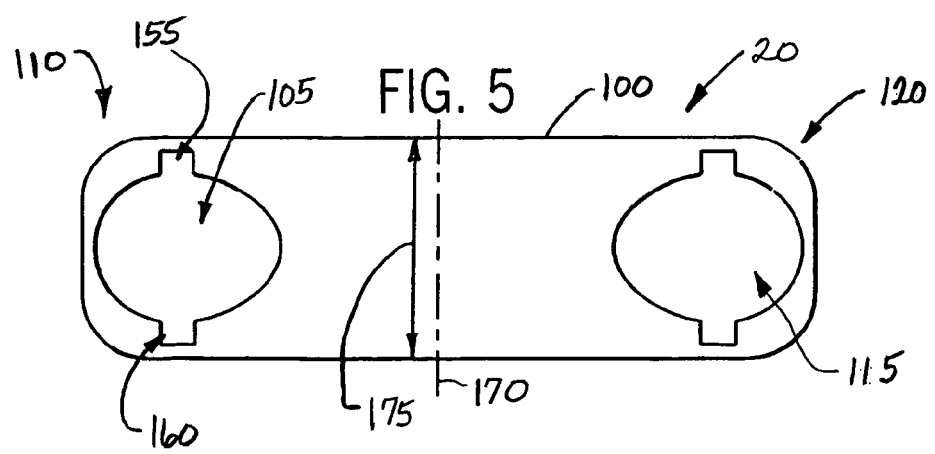

HOSE RESTRAINT APPARATUS

FIELD OF THE INVENTION

The invention relates to a hose restraint apparatus and, more specifically, relates to an apparatus configured to restrain a hose at an outlet structure of a low-pressure conveyance system.

BACKGROUND OF THE INVENTION

Seed and fertilizer products are distributed from a hopper of an air seeder to a delivery tool via a pneumatic conveyor tube. A certain known conveyor tube connects with a flow dividing header. The dividing header includes a manifold having a series of outlet ports configured to direct the air-entrained product into a number of conduits, each connected to a delivery tool (e.g., a seed boot, etc.).

For example, U.S. Pat. No. 6,227,770 entitled "Conveyor tube and Distributor Header for Air Conveyor", filed Feb. 4, 1999, hereby incorporated herein by reference in its entirety, discloses a conveyor tube in combination with a distribution header for air conveyors such as air seeders. The distribution header includes angularly spaced apart and radially-outward extending outlet ports configured to direct divided portions of an incoming flow of air-entrained material. A hose clamp device connects each of these outlet ports to a flexible hose that leads to a respective delivery tool.

However, the air distribution system described above has several drawbacks. For example, the known hose clamp device is configured to squeeze an exterior of the outlet port. This causes the interior of the outlet port to squeeze against the exterior of the flexible hose. Also, miscellaneous forces associated with operation of the air distribution system in the field (e.g., vibration) are known to cause the hose clamps to slip off the outlet port, as well as cause the flexible hoses to slip out of the outlet port, during operation. To accommodate these miscellaneous forces, extensions are provided at the exterior of the outlet ports to restrain the hose clamp from slipping off of the outlet port. However, the extensions are not operable to restrain a position of the flexible hose in the outlet port until the hose clamp is sufficiently tightened, which is cumbersome for an operator.

Therefore, there is a need or desire for a hose restraint device to configured to enhance restraint of the flexible hose at the outlet port of the distribution header of a pneumatic distribution system. The restraint device should also be configured to be compatible with known constructions of distribution headers associated with pneumatic distribution systems.

SUMMARY OF THE INVENTION

The present invention provides a system for and a method of restraining a flexible hose at an outlet port of a distribution header of a pneumatic distribution system that meets the desires and needs described above. The restraint device of the present invention thus enhances the ready attachment and detachment of the flexible hose to the outlet port of the distributor header.

In a first embodiment of the present invention, a restraint apparatus configured to restrain movement of an end of a hose inserted into an outlet port of an outlet structure is provided. The restraint apparatus includes a restraint member having a flat, planar shape. The restraint member further includes a first end and a second end opposite the first end. A first opening is located at the first end of and extending through the restraint member, and a second opening is located at the second end of and extending through the restraint member. The first and second ends of the restraint member are configured to be biased toward each other such that the first opening is operable to receive the outlet port therethrough and the second opening is operable to receive the hose therethrough. Upon release of the first and second ends of the restraint member, the first and second ends are operable to exert a bias force against the outlet structure and the hose, respectively, in a manner so as to resist removal of the hose from the outlet structure. Upon removal of the outlet structure and the hose from holes in the restraint member, the restraint member is operable to substantially return back to its original flat, planar shape.

The preferred restraint member includes a width between the first and second openings that is less than a width at the first or second end of the restraint member. In one embodiment, the width of the restraint member increases in a tapered manner from a central axis of symmetry towards each of the first and second ends of the restraint member. The first and/or second openings of the restraint member can generally be elliptical-shaped, egg-shaped, circular-shaped, rectangular-shaped, etc. The preferred restraint member includes a stainless steel composition, yet the type of composition (e.g., plastic, etc.) can vary.

In another embodiment, the present invention provides an air distribution system that includes a manifold having an inlet in communication with a plurality of outlet ports each extending through an outlet structure, at least one flexible hose configured to be inserted into one of the plurality of outlet ports of the manifold; and a hose restraint member having a first opening located at a first end and a second opening located at second end. The first and second ends of the restraint member are configured to be biased toward each other such that the first opening is operable to receive the outlet structure therethrough and the second opening is operable to receive the hose therethrough. Upon release of the first and second ends of the restraint member, the first end of restraint member is configured to bias against the outlet structure and second end of the restraint member is configured to bias against the hose in a manner operable to resist removal of the at least one flexible hose from the outlet structure.

The present invention also provides a method of restraining a hose at an outlet structure of a low-pressure air distribution system. The method includes the steps of providing a restraint member having an original shape that is generally flat, the restraint apparatus comprising a material composition characterized with a shape memory such that the retainer element reverts substantially back to the original shape from release in a distorted position; receiving the outlet structure through a first opening of the retainer element; distorting the restraint apparatus in a generally U-shaped configuration; and receiving an end of a hose through a second opening of the retainer element, the second opening located opposite the first opening of the retainer element; inserting hose into the outlet structure; and releasing the restraint apparatus from the biased U-shaped configuration such that the restraint apparatus applies a bias force operable to restrain the flexible hose the outlet structure.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 2 shows a detailed perspective view of the restraint apparatus of the present invention attaching the flexible hose to the distribution head shown in FIG. 1.

FIG. 3 shows a bottom plan of the restraint apparatus attached at an outlet structure of the distribution head along line 3-3 in FIG. 2.

FIG. 4 illustrates a partial cross-section view of the restraint apparatus attached at the outlet structure of the forced air distribution head along line 4-4 in FIG. 3.

FIG. 5 shows a detailed top plan view of a first embodiment of a restraint apparatus in accordance with the present invention.

DETAILED DESCRIPTION OF THE PREFERRED EMBODIMENTS

Figure 1:
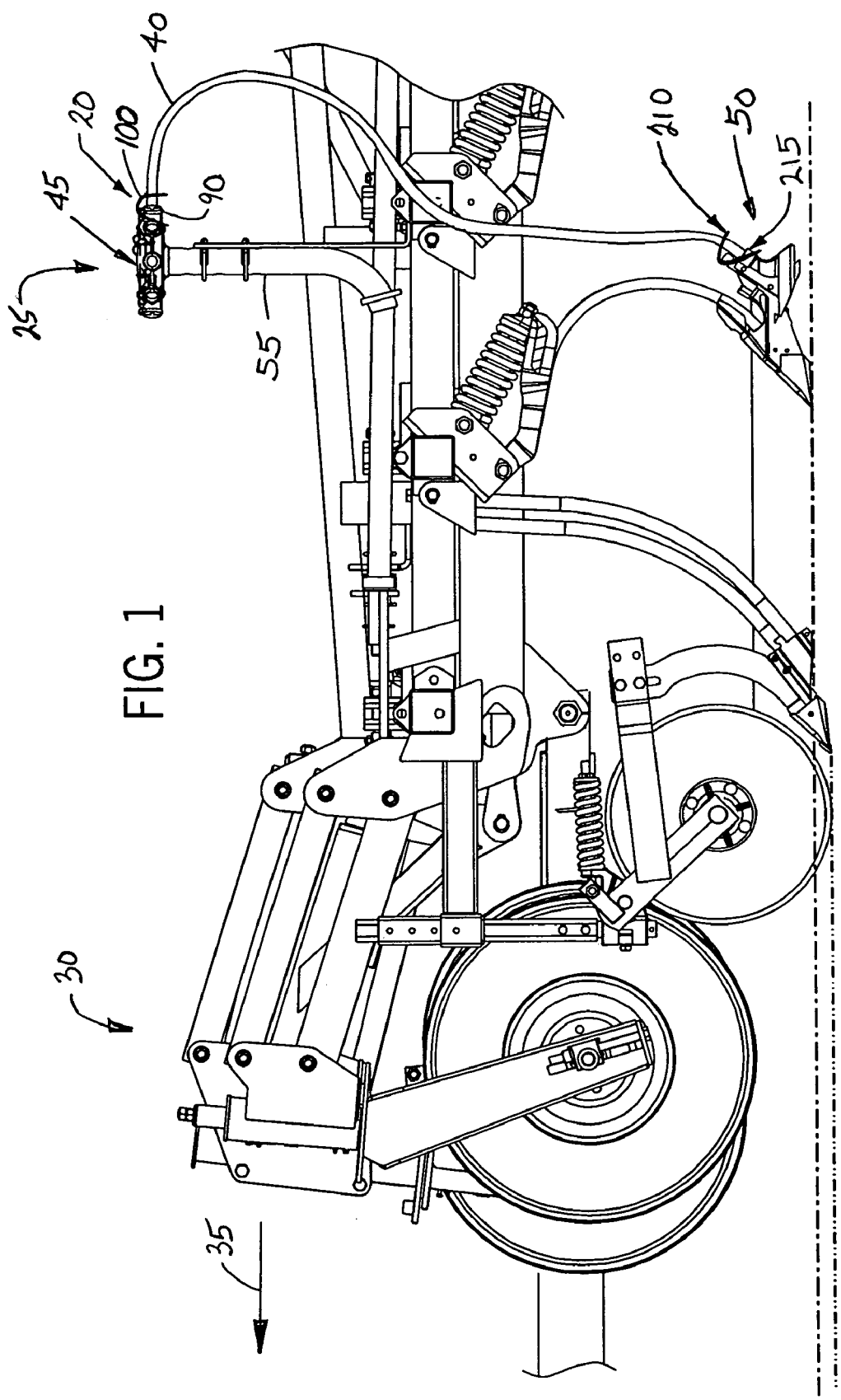
FIG. 1 illustrates a side elevation view of an agricultural implement employing a forced air conveyance system that includes flexible hose connected at a distribution head via a restraint apparatus in accordance with the present invention.

Referring to FIG. 1, a preferred embodiment of a fastener apparatus 20 in accordance with the present invention is shown employed on a forced air conveyance system 25 carried on an agricultural implement 30 operable to be towed by a tow vehicle (not shown) in a forward direction of travel (illustrated by arrow 35). The fastener apparatus 20 is positioned to restrain a flexible hose 40 attached at a distribution head or manifold 45 of the forced air conveyance system 25 mounted on the implement 30. The illustrated forced air conveyance system 25 is employed to convey granular material or product (e.g., seed, fertilizer, etc.) to a delivery tool 50 for distribution of the granulator material across a field, in a manner known in the art.

Referring to FIGS. 1 and 2, the illustrated forced air conveyance system 25 includes an upright conveyance tube 55 with an upper end mounted by the distribution head 45. The lower end or inlet of the conveyor tube 55 is configured to receive an air entrained granular material such as seed and/or fertilizer by way of a blower and metering devices (both not shown) mounted on an air cart (not shown) in a manner well known in the art. As this air entrained granular material passes upwardly through the conveyor tube 55, the conveyor tube 55 includes inwardly directed and spaced apart projections (not shown) disposed to impart a controlled degree of turbulence in the upwardly moving flow of air-entrained granular material as it passes into the distribution head 45.

Referring specifically to FIG. 2, the preferred distribution head 45 of the forced air conveyance system 25 comprises a top section 60 and a bottom section 65. Each of the top and bottom sections 60 and 65 is preferably molded from a polyurethane glass filled plastics material, which resists wear due to abrasion resulting from the materials being handled and which at the same time provides for economy in the manufacturing processes. The top and bottom sections 60 and 65 of the distribution head 45 connect together to define a series of radially-outward projecting outlet structures 70, each including an outlet port 75 extending therethrough.

The distribution head 45 is designed to swing the flow of the air-entrained granular material from a vertical direction around into a horizontal direction in a manner that divides the flow substantially equally amongst the series of outlet ports 75. Each of the series of outlet structures 70 and respective ports 75 extends radially outward from, and in an equally angular-spaced relationship to each other, around a vertical central axis of symmetry 80 of the distribution head 45. The ports 75 all lie in a common plane normal to the central axis 80. The top and bottom sections 60 and 65 of the distribution head 45 are typically chemically bonded (e.g., glued) together.

A hose clamp 90 in combination with a rib member 92 can be employed to augment connection of the flexible hose 40 in the outlet port 75 of the outlet structure 70. The hose clamp 90 is operable to squeeze or press the rib member 92, located along a circumference of each outlet port 75, into an exterior of the flexible hose 40. The hose clamp 90 also augments connection of, and thereby reducing opportunities for leaks at, the outer radial top and bottom sections 60 and 65 of the distribution head 45 at each outlet structure 75. Each outlet structure 75 includes extensions 94 and 95 located at diametrically opposite of one another. The extensions 94 and 95 are generally configured to retain the hose clamp 90 from slipping off the outlet structure 75. Unfortunately in harsh environmental conditions, the hose clamp 90 and rib member 92 may not be enough to restrain the hose 40 in the port 75.

Still referring to FIG. 2, while the distribution head 45 is shown to include seven outlet structures 70, it should of course be realized that the number of outlet structures 70 and respective ports 75 extending therethrough can vary. Commonly employed embodiments of the distribution head 45 employ anywhere from seven to twelve equally spaced outlet structures 70 which are sized to insure that the outward flow velocity of the flow of air-entrained granular material through each respective outlet port 75 is sufficient so as to ensure continued entrainment of the materials being conveyed, thus reducing opportunities for clogging problems.

Referring to FIGS. 1-3, each outlet port 75 is operable to communicate the flow of air-entrained granular material to a respective flexible hose 40 secured at the outlet structure 70 by the restraint apparatus 20 of the invention. Each of the flexible hoses 40 leads to the respective delivery tool 50 (see FIG. 1). Outlet structures 70 that are not attached by a flexible hose 40 can be manually plugged in a known manner to prevent the escape of granular material.

Still referring to FIGS. 1-3, the preferred flexible hose 40 is configured to be inserted into the outlet port 75 defined by each of the outlet structures 70. The flexible hose 40 communicates the flow of air-entrained granular material to the delivery tool 50 (see FIG. 1) for distribution across the field. The flexible hose 40 can vary in material composition and size and is not limiting on the invention. Typically, the preferred flexible hose 40 can withstand a maximum of 354 psi, even though the hose 40 will experience a maximum pressure of 2 psi, and an average pressure of 0.5 psi, from the forced air conveyance system 25.

As shown in FIGS. 3 and 4, the restraint apparatus 20 of the present invention is configured to hold and restrain the flexible hose 40 in attachment at the outlet structure 70 of the distribution head 45. Referring to FIG. 5, the preferred restraint apparatus 20 includes a generally flat, plate-shaped restraint member 100 elongated in length in an original, unbiased state. The desired composition of the restraint member 100 is stainless steel, but the type of composition (e.g., steel, brass, plastic, etc.) can vary so long as the material is operable to provide an adequate bias force at the outlet structure 70 and at the flexible hose 40 (See FIG. 3).

Figure 6:
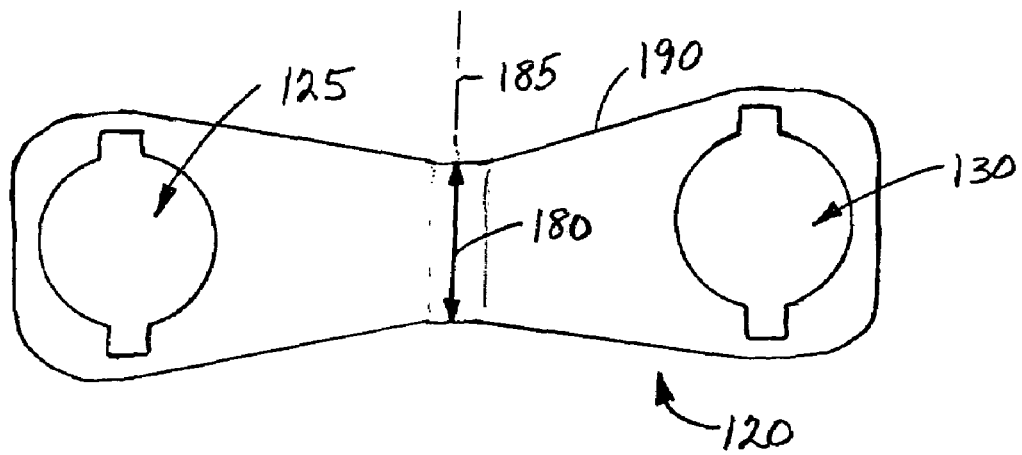
FIG. 6 shows a detailed top plan view of a second embodiment of a restraint apparatus in accordance with the present invention.
Figure 7:
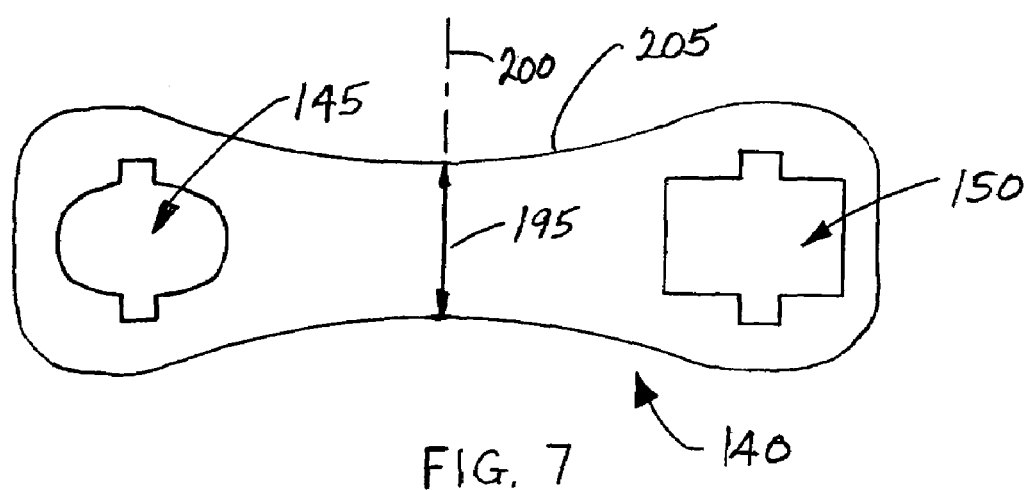
FIG. 7 shows a detailed top plan view of a third embodiment of a restraint apparatus in accordance with the present invention.

Referring specifically to FIG. 5, the restraint member 100 includes a first opening 105 at a first end 110 and a second opening 115 at a second end 120 opposite the first end 110 of the restraint member 100. Each opening 105 and 115 is generally egg-shaped. Although the illustrated first and second openings 105 and 115 of the restraint apparatus 20 are egg-shaped, it is understood that the shape (e.g., egg-shaped, elliptical, circular, square, rectangular, polygonal, etc.) of the openings 105 and 115 can vary. For example, FIG. 6 illustrates another embodiment of a restraint apparatus 120 that includes a first and a second opening 125 and 130 each having a circular-shape. In another example, FIG. 7 illustrates another embodiment of a restraint apparatus 140 that includes a first opening 145 and a second opening 150 having different shapes. The first opening 145 is elliptical-shaped and the second opening 150 is rectangular-shaped.

Still referring to FIG. 5, one or both of the first and second openings 105 and 110 can further each include a pair of cutout portions 155 and 160 located radially opposite one another. Each cutout portion 155 and 160 is of a shape and size to receive extensions 94 and 95 therethrough only when the end 110 or 120 and respective cutout portions 155 and 160 are generally aligned but limited to a ninety-degree angle relative to a central axis 165 of the outlet port 75 and respective extensions 94 and 95 (see FIG. 3).

As shown in FIGS. 2, 3 and 5, the restraint apparatus 20 is preferably symmetrical about a central axis 170 between the first and second openings 105 and 115. The bias force exerted by the restraint apparatus 20 against the flexible hose 40 and/or the outlet structure 70 (see FIGS. 2 and 3) can be adjusted by varying a width 175 of the restraint apparatus 20. In FIG. 6, the restraint apparatus 120 includes a width 180 that increases from a central axis 185 in a direction toward one or both of first and second openings 125 and 130 so as to define a linear edge 190 and a somewhat hourglass shape. In FIG. 7, the restraint apparatus 140 includes a width 195 that increases from a centerline axis 200 toward the openings 145 and 150 so as to define a curvilinear shaped edge 205.

Referring to FIGS. 5-7, varying the width 175, 180 and 195 allows the operator to select a predetermined bias force to be applied by the restraint apparatus 20, 120, 140 at the flexible hose 40 and/or outlet structure 70 (see FIG. 2). The bias force applied at the hose 40 and the outlet structure 70 is selectively provided in accordance with the varying width 175 so as to provide the desired bias force to prevent the hose 40 from slipping or working its way out of the outlet port 75 of the outlet structure 70 of the distribution header 45. Too aggressive of a bias force can cause the ends 110 and 120 of the restraint apparatus 20 to slowly cut through and/or pinch the flexible hose 40.

In operation, the top and bottom sections 60 and 65 of the distribution head 45 are mated together and chemically bonded or glued in a known manner. The restraint apparatus 20 is aligned at a right angle to receive the outlet structure 70 and respective extensions 94 and 95 through the first opening 105 and the respective cutout portions 155 and 160. The restraint apparatus 20 is also configured to accommodate adding the hose clamp 90 at the outlet structure 70 so as to augment connection of the flexible hose 40 thereto, as well as to augment connection of the top and bottom sections 60 and 65 of the distribution head 45 together.

The first and second ends 110 and 120 of the restraint apparatus 20 are then biased toward one another. The free end of the flexible hose 40 is then inserted through the second opening 115 in the restraint apparatus 20 and into the outlet port 75 defined by the outlet structure 70. Upon insertion of the flexible hose 40 into the outlet port 75 of the outlet structure 70, the operator releases the ends 110 and 120 of the restraint apparatus 20. Upon release, the restraint apparatus 20 naturally wants to return to its original flat, planar-shape. The spring characteristic of the restraint apparatus 20, the material property associated with biasing the restraint apparatus 20 to return to its original flat-shape, causes the first end 100 of the restraint apparatus 20 to apply a bias force at the outlet structure 75 and causes the second end 110 of the restraint apparatus 20 to apply another bias force against the flexible hose 40. Yet, the flexible hose 40 inserted through the first opening 105 and the outlet structure 70 inserted through the second opening 115 prevent the restraint apparatus 20 from completely flattening out. Rather, the ends 110 and 120 of the restraint apparatus 20 are positioned or disposed at an angle ($\beta$) less than ninety-degrees with respect to the central axis 165 of the outlet structure 70 and the flexible hose 40 attached thereto.

At the less than the ninety-degree alignment angle ($\beta$) of the first end 100 and respective cutout portions 155 and 160 with respect to the central axis 165 of the outlet structure 70, the first end 100 of the restraint apparatus 20 engages against the extensions 94 and 95 at the exterior circumference of the outlet structure 70 so as to exert an additional force against removal or slippage of the flexible hose 40 and/or restraint apparatus 20 from the outlet port 75 of the outlet structure 70. The width 175 of the restraint apparatus 20 is predetermined or adjusted in the field to provide the desired bias force of the restraint apparatus 20 against the outlet structure 70 and/or flexible hose 40.

When desired, an operator can squeeze the ends 110 and 120 of the restraint apparatus 20 together once again in a manner to allow release of the flexible hose 40 from the outlet structure 70 of the distribution head 45.

Although the restraint apparatus 20 of the present invention is shown attached between the flexible hose 40 and the outlet structure 70 of the distribution head 45, the invention is not so limited. As shown in FIG. 1, a restraint apparatus 210, similar in construction to the restraint apparatuses 20, 120 or 140 described above, can be employed to secure attachment of the opposite end of the flexible hose 40 at an inlet structure 215 of the delivery tool 50.

Many changes and modifications could be made to the invention without departing from the spirit thereof. The scope of these changes will become apparent from the appended claims.

I claim:

1. A forced air conveyance system for a granular material, comprising:
   a distribution head having an inlet in communication with a plurality of outlet ports each extending through an outlet structure;
   a plurality of hoses each configured to be inserted into one of the plurality of outlet ports of the distribution head; and a restraint member having a first opening located at a first end and a second opening located at second end, wherein the first and second ends of the restraint member are configured to be biased toward each other such that the first opening is operable to receive the outlet structure therethrough and the second opening is operable to receive the hose therethrough, and wherein upon release of the first and second ends of the restraint member, the first end of restraint member is configured to bias against the outlet structure and second end of the restraint member is configured to bias against the hose in a manner operable to resist a longitudinal force directed to remove the hose from the outlet structure.

2. The system as recited in claim 1, wherein one or more of the plurality of outlet structures includes a first extension and a second extension positioned in a radial outward direction from an exterior surface of the outlet structure.

3. The system as recited in claim 2, wherein the first opening of the restraint member further includes a first cutout portion and a second cutout portion configured to receive the first and second extensions of the one or more outlet structures therethrough only when the first and second cutout portions are generally aligned at a ninety degree angle with respect to the first and second extensions.

4. The system as recited in claim 1, wherein the restraint member element is comprised of stainless steel.

5. The system as recited in claim 1, wherein the restraint member is comprised of a material composition such that upon release from biasing the first and second ends of the restraint member towards one another, the restraint member is configured to substantially return to an original shape.

6. The system as recited in claim 1, wherein a hose clamp is positioned to squeeze a top and a bottom section of the distribution head together.

7. The system as recited in claim 1, wherein a width at a center axis of symmetry of the restraint member is less than a width at one of the first and second ends of the restraint member.

8. The system as recited in claim 1, wherein the restraint member defines an edge between a central axis of symmetry and one of the first and second openings, and wherein the edge is curvilinear-shaped.

9. The system as recited in claim 1, wherein the restraint member defines an edge between a central axis of symmetry and one of the first and second openings, and wherein the edge tapers at a linear slope toward the central axis of symmetry.

10. The system as recited in claim 1, further comprising:

a delivery tool operable to distribute the granular material to a field, the deliver tool including an inlet structure configured to receive one of the plurality of flexible hoses connected to the distribution head; and a second restraint member having a first opening located at a first end and a second opening located at second end, wherein the first and second ends of the second restraint member are configured to be biased toward each other such that the first opening is operable to receive an inlet structure of the delivery tool therethrough, and the second opening is operable to receive one of the plurality of hoses therethrough, and wherein upon release of the first and second ends of the second restraint member, the first end of second restraint member is configured to bias against the inlet structure and second end of the restraint member is configured to bias against the hose in a manner operable to resist removal of the flexible hose from the inlet structure of the delivery tool.

* * * * *